W. H. POTTS.
TRACTOR HITCH FOR SCRAPERS.
APPLICATION FILED MAR. 27, 1920.

1,403,627.

Patented Jan. 17, 1922.
2 SHEETS—SHEET 1.

INVENTOR.
William H. Potts.
BY
ATTORNEY.

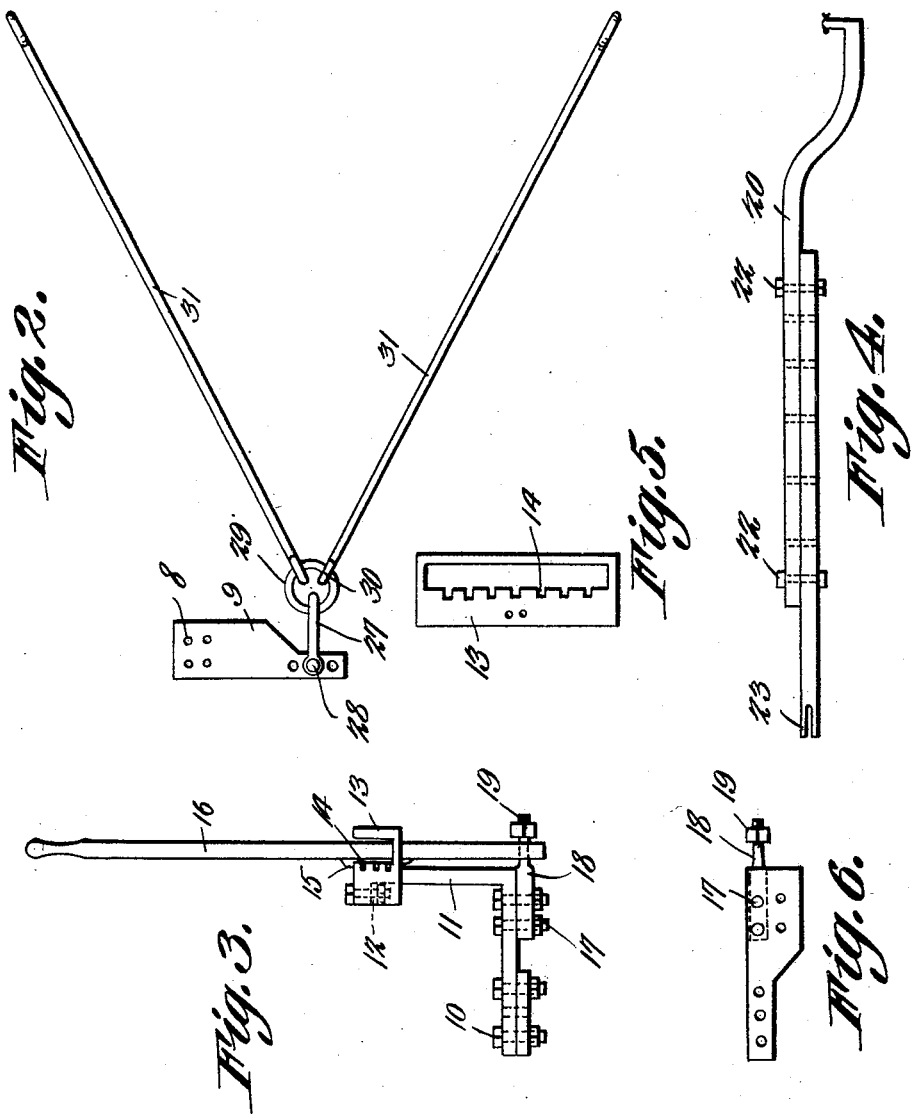

UNITED STATES PATENT OFFICE.

WILLIAM H. POTTS, OF RIVERBANK, CALIFORNIA.

TRACTOR HITCH FOR SCRAPERS.

1,403,627.  Specification of Letters Patent.  Patented Jan. 17, 1922.

Application filed March 27, 1920. Serial No. 369,246.

*To all whom it may concern:*

Be it known that I, WILLIAM H. POTTS, a citizen of the United States of America, and resident of Riverbank, in the county of Stanislaus and State of California, have invented certain new and useful Improvements in Tractor Hitches for Scrapers, of which the following is a specification.

This invention has reference to excavating devices, and more particularly to a means for attaching a scoop to the tractor, used in connection therewith.

The primary object of the invention is to provide means to permit the ready and easy operation of the scoop from the operator's seat of the usual tractor now in use.

A further object of the invention is to provide means for moving the scoop to a discharging position, together with means for locking the scoop in such position, thus insuring against the scoop returning to its normal position before the same has accomplished the dumping result.

With the foregoing and other objects in view, the invention consists in the details of construction and in the arrangement and combination of parts to be hereinafter more fully set forth and claimed.

Referring to the drawings—

Fig. 2 illustrates a plan view of the connecting plate and connecting rods;

Fig. 3 illustrates a side elevational view of the connecting plate, showing the operating lever attached thereto;

Fig. 4 illustrates a detail view of the supporting bar;

Fig. 5 illustrates a plan view of the keeper, and

Fig. 6 illustrates a plan view of the supporting plate showing the bearing arm.

Figure 1:
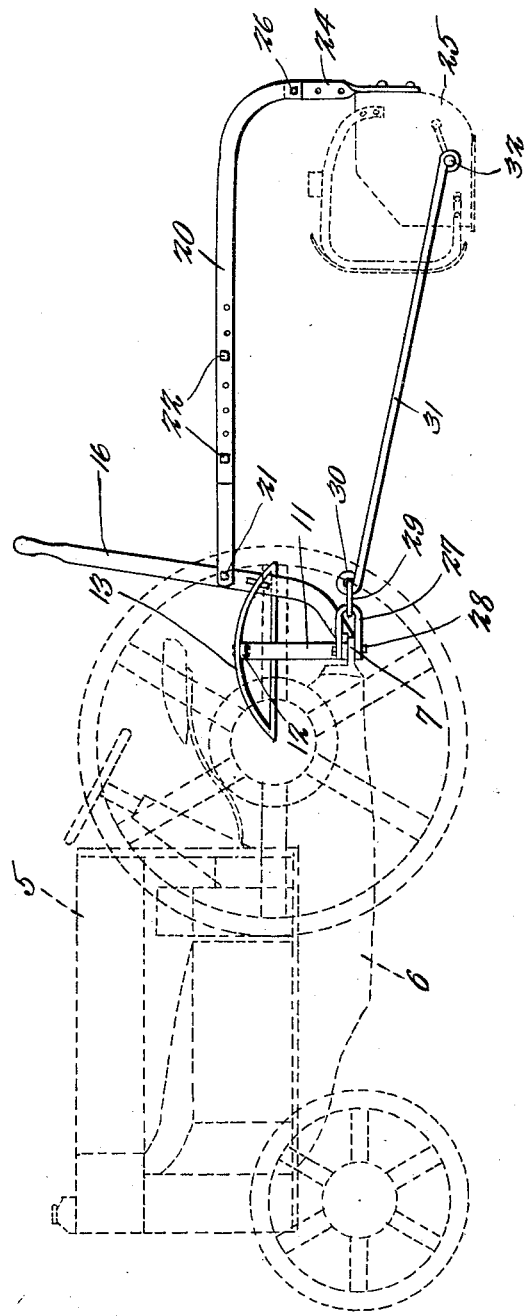
Fig. 1 illustrates a side elevational view of a tractor showing the scoop as attached thereto.

Referring to the drawings in detail, the device is shown as attached to the tractor 5, which is of the usual construction and includes the frame 6, which is provided with a flange 7, formed integrally therewith, which flange is provided with a plurality of openings adapted to register with the openings 8 formed in the connecting plate 9, which openings provide means to accommodate the securing bolts 10 for securing the plate 9 to the tractor frame. Connected to the plate 9, and extending at right angles thereto, is an arm 11, which arm 11 is provided with a right angled end 12 adapted to provide a means for securing the keeper 13 thereto, the keeper being shown as curved and provided with a plurality of notches 14 which notches are adapted to accommodate the bar 15 provided on the operating lever 16 for supporting the lever 16 in predetermined positions of adjustment.

Secured to the plate 9, as by means of the bolts 17, is the bearing arm 18, which extends beyond the arm 11, and is positioned within a suitable opening provided in the lower end of the operating lever 16, the nut 19 being provided to secure the lever 16 to the bearing arm 18.

An adjustable supporting arm 20 has its forward end pivotally connected to the operating lever 16 as at 21, and includes a pair of arms each of which being provided with a plurality of openings disposed in spaced relation with each other, which openings are adapted to receive the bolts 22 for adjustably connecting the arms.

One end of the supporting arm 20 extends downwardly and is forked as at 23 to straddle one end of the bar 24, which has its lower end bolted, or otherwise secured to the scoop 25. The connection between the arm 20 and bar 24, is made by means of the bolt 26, the connection being such as will permit of pivotal movement of the scoop 25 with relation to the arm 20, for purposes to be hereinafter more fully described.

A connecting link 27 embraces a portion of the plate 9, and is connected thereto by means of the bolt 28, and this link has connection with the ring 29, which ring 29 accommodates the eyes 30 formed in one end of the respective connecting rods 31, the opposite ends of the rods having pivotal connection with the scoop, at opposite sides thereof, as by means of the bolts 32.

In the operation of the device, the scoop is moved along the ground surface until the same has been filled, the operating lever 16 is now moved to a position to cause the supporting arm 20 to move towards the tractor.

From the foregoing, it is obvious that when the supporting arm 20 has been moved to this position, the scoop 25 pivots forwardly to discharge the material, whereupon the lever is again moved to a position as indicated by Fig. 1 of the drawings, and the scoop is now in an operative position.

I claim:

1. In combination with a tractor, a scoop, means for connecting the scoop to the tractor, said means including a supporting plate, an operating lever pivotally connected to the supporting plate, a supporting bar having pivotal connection with the operating lever, means for pivotally connecting the supporting bar to the scoop, connecting rods for connecting the scoop to the supporting plate, means for pivotally connecting the connecting rods to the scoop, and means for securing the operating lever in its positions of adjustment.

2. In combination with a tractor, a scoop, means for connecting the scoop to the tractor, said means comprising a connecting plate, connecting rods connecting the scoop to the connecting plate, means for pivotally connecting the said scoop to the said rods, an operating lever, a supporting bar including a pair of opposed arms adjustably connected together, means for pivotally connecting the bar to the operating lever, and means for pivotally connecting the supporting bar to the scoop.

3. In combination with a tractor, a scoop, means for connecting the scoop to the tractor, the said means including a supporting plate adapted to be attached to a tractor, an operating lever pivotally connected to the supporting plate, a supporting bar having pivotal connection with the operating lever, means for pivotally connecting the supporting bar to the scoop, connecting rods, pivots on the scoop below the point of attachment of the means for connecting the said scoop to the bar to which the connecting rods are pivoted, and means for anchoring the connecting rods to the plate.

WILLIAM H. POTTS.